United States Patent
Lee

(10) Patent No.: US 6,829,097 B2
(45) Date of Patent: Dec. 7, 2004

(54) DOUBLE PASS POLARIZATION INDEPENDENT MIXER AND METHOD USING SINGLE NONLINEAR MIXER MEDIA AND OFF-AXIS FOCUSING

(75) Inventor: Gregory S. Lee, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/410,186

(22) Filed: Apr. 10, 2003

(65) Prior Publication Data

US 2004/0201905 A1 Oct. 14, 2004

(51) Int. Cl.[7] .............................................. G02B 27/10
(52) U.S. Cl. ...................................... 359/640; 359/629
(58) Field of Search ................................. 359/618, 629, 359/634, 638, 639, 640, 330

(56) References Cited

U.S. PATENT DOCUMENTS 4,911,543 A * 3/1990 Hodgson ..................... 359/369
5,056,887 A * 10/1991 Ohshima ..................... 385/36

* cited by examiner

Primary Examiner—Scott J. Sugarman
Assistant Examiner—Darryl J. Collins

(57) ABSTRACT

An apparatus includes a mixer, a combiner and first and second reflectors. The mixer has first and second inputs and has first and second outputs. The combiner includes first and second parts where the first output provides a mixed signal to the first part and the second part provides a combined signal to the second input. The first reflector receives a remaining signal from the first part and provides a reflected composite signal to the second part. The second reflector receives a split off pump signal from the first part and provides a reflected pump signal to the second part.

20 Claims, 4 Drawing Sheets

DOUBLE PASS POLARIZATION INDEPENDENT MIXER AND METHOD USING SINGLE NONLINEAR MIXER MEDIA AND OFF-AXIS FOCUSING

BACKGROUND OF THE INVENTION

1. Field of the Invention

The present invention relates to a mixer of an arbitrarily polarized input signal. In particular, the invention relates to an optical mixer that uses two passes through a single nonlinear medium to achieve polarization independent mixing.

2. Description of Related Art

Nonlinear wavelength conversion can be used to measure very high-speed signals in an optical sampling oscilloscope. Nonlinear conversion crystals typically require specific polarizations of the signal under test, the pump, and the sum frequency generation (SFG) light waves. Whereas the pump light, being part of the instrument, can always be polarized correctly, the users input signal may have unknown polarization. Polarization controllers based on feedback have been used in the past but these are capable of polarization adjustments of at best several kilohertz bandwidth. Polarization interleaving has been employed so that the polarization changes at the bit rate, necessitating tens to hundreds of gigahertz of polarization-acquisition bandwidth. It is desirable for an optical sampling oscilloscope to simply display the reconstructed user signal power independent of the input polarization.

Use of a polarization beam splitter to split a pump laser beam polarized on a 45 degree axis with respect to the principal axis of the polarization into two channels is known. In this way 50% of the pump power passes into each of the two different channels, each channel characterized by a polarization orthogonal to the other. The input signal is also passed through the polarization beam splitter, and the two polarization components of the arbitrarily polarized input signal are split apart. These two channels are passed through a corresponding nonlinear crystal to produce a mixed signal. However, this results in a 50% reduction in conversion efficiency due to the reduced pump intensity.

The use of two nonlinear crystals employed in series so as to not suffer a theoretical 3 dB penalty is also known. However, the two crystals add to the cost, there is a need to employ an optical component between the two crystals that would correct for color and temporal dispersion, and there is a need to match the crystals, especially their temperatures.

SUMMARY OF THE INVENTION

As an example of the invention, an apparatus includes a mixer, a combiner and first and second reflectors. The mixer has first and second inputs and has first and second outputs. The combiner includes first and second parts where the first output provides a mixed signal to the first part and the second part provides a combined signal to the second input. The first reflector receives a remaining signal from the first part and provides a reflected composite signal to the second part. The second reflector receives a split off pump signal from the first part and provides a reflected pump signal to the second part.

As an alternative example of the invention, a method includes mixing into a once mixed signal, separating the once mixed signal, twist reflecting a first signal, retro-reflecting a second signal, and mixing into a twice mixed signal. The mixing into a once mixed signal mixes a pump signal of a predetermined polarity with a signal under test of an arbitrary polarity. The separating the once mixed signal separates a separated pump signal and a remaining signal. One of the separated pump signal and the remaining signal is defined as the first signal, and the other of the pump signal and the remaining signal is defined as the second signal. The twist reflecting twist reflects the first signal, and the retro-reflecting retro-reflects the second signal. The mixing into a twice mixed signal mixes the twist reflected first signal and the retro-reflected second signal.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

To improve on the known use of a polarization beam splitter to split a pump laser beam polarized on a 45 degree axis with respect to the principal axis of the polarization into two channels, one example of an optical oscilloscope front end uses a split wave plate to rotate one spatial half of the signal and not the other (e.g., after being split into two distinct channels), but this also results in 3 dB (50%) loss of signal power.

In another example of an optical oscilloscope front end that uses a single crystal, the input signal tinder test of arbitrary polarization propagates one way through the crystal and reflects back in a reflector that includes a 45-degree Faraday rotator (nonreciprocal rotator) and a single-bounce mirror to rotate the polarization by 90 degrees and propagate the other way back through the crystal. A pump laser of predetermined polarization would be used throughout. Careful attention must be paid to the collimating lens doublet to avoid a practical difficulty with this scheme where the collimating lens doublet does not fully cancel both the chromatic focal shift between the signal and pump beams and the temporal dispersion between the signal and pump due to the refractive index dispersion in the nonlinear crystal. Such simultaneous correction may prove too hard to achieve in practice.

In another example of an optical oscilloscope front end, an apparatus provides an on-axis, single crystal, two-pass, polarization-independent conversion. To insure adequate signal isolation (i.e., to prevent reflections back to the user), one requires a polarization independent optical isolator on the front end as well as the 45-degree Faraday rotator in the reflector as described above. Thus, a minimum of two nonreciprocal elements are required for an on-axis implementation which might prove costly.

Figure 1:
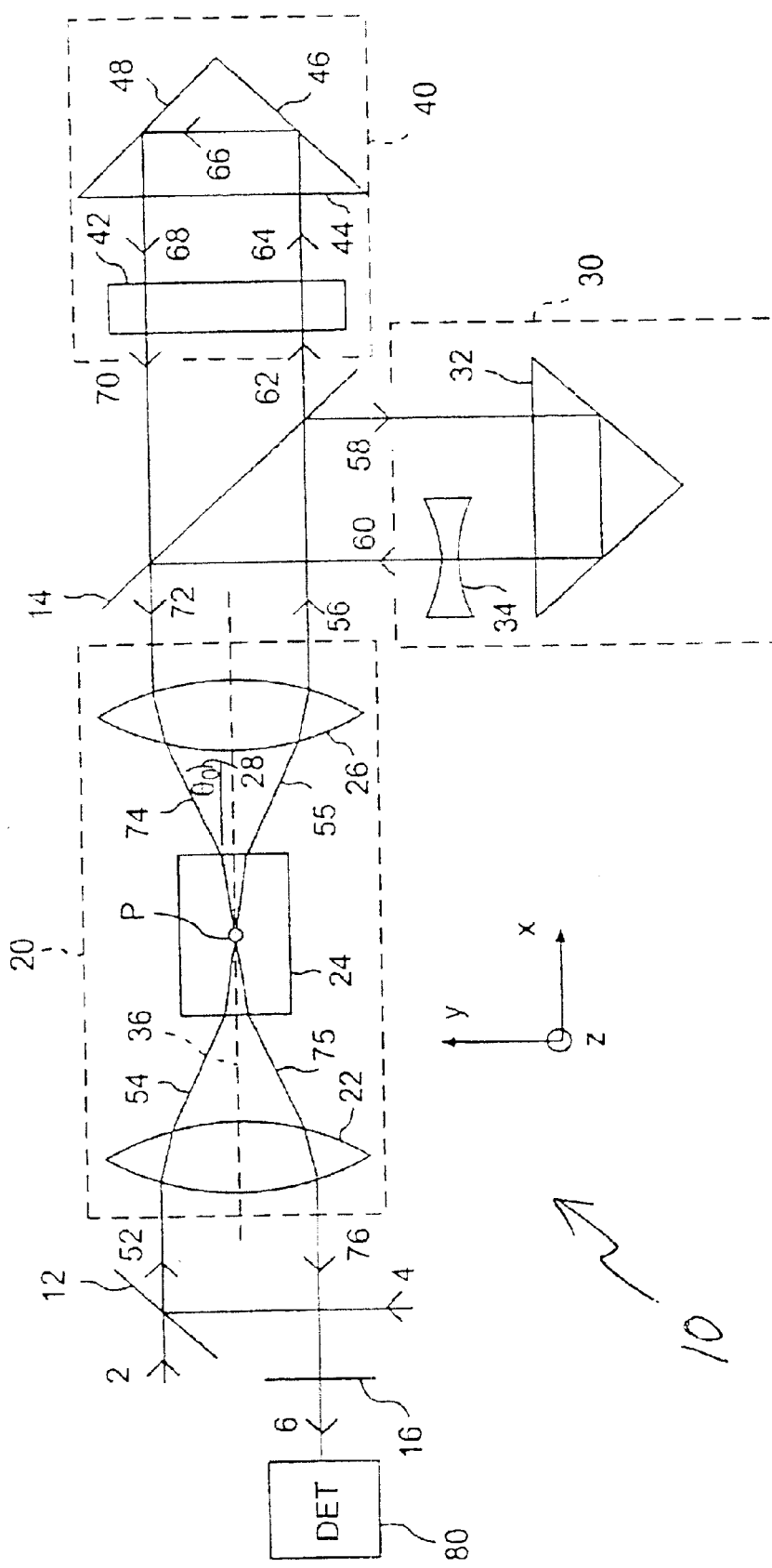
FIG. 1 is an optical schematic of an embodiment of the invention.

In an improved example of the invention, FIG. 1 depicts a block diagram of an optical sampling oscilloscope front end 10 that employs a novel apparatus to perform the sampling. A dichroic beam splitter 12 functions as a combiner and combines a signal beam under test 2 (typically 1530–1620 nm wavelength) and a pump beam 4 (typically a shorter wavelength, e.g., 780 nm). These beams 2, 4 are parallel to but spaced apart from a mixer central axis 36 and are off-axis focused by a first achromatic lens 22 into a nonlinear crystal 24 (e.g., periodically-poled lithium niobate, PPLN). The interaction between the signal and the intense pump pulse in the nonlinear crystal produces a first-pass sum frequency generation (SFG) pulse. All three light waves exit (off axis) and are collimated by a second achromatic lens 26. As with the first achromatic lens 22, the beams so collimated are offset from a lens axis 36 by the second achromatic lens 26. A second dichroic beam splitter 14 passes a composite of the signal and SFG beams but reflects the pump beam. The signal and SFG light pass through a quarter wave plate 42 designed for the signal wavelength but not necessarily for the SFG wavelength. The signal and SFG light, after passing through a quarter wave plate 42, are retro-reflected after 2 bounces from a 180-degree prism. The signal and SFG light pass back through the quarter wave plate 42, and from there pass through the dichroic beam splitter 14. The pump light retro-reflects from a 180-degree prism and optionally through an additional correction lens 34. This additional lens can serve two purposes. First, it corrects any chromatic aberrations left over from imperfect achromats. Second, by lateral adjustment, it corrects angular mismatch of the 180-degree prisms (due to imperfect construction). The pump beam, after bouncing off the dichroic beam splitter 14 again, then recombines with a reflected composite of the 90 degree twisted signal and arbitrarily twisted SFG light.

More particularly, in FIG. 1, an optical sampling oscilloscope front end 10 includes a first combiner 12, an optical mixer 20, a second combiner 14 (also serving as a beam splitter), a pump retro-reflector 30, a signal retro-reflector 40, a filter 16 and a detector 80. The signal retro-reflector 40 might well be generically called an optical twist reflector due to the 90 degree rotation of the polarization of the reflected beam as discussed further herein. In operation, a signal beam under test 2 and a first pump beam 4 (a pulse) are combined on the first combiner 12 to form a pre-mixed beam 52. The pre-mixed beam 52 is focused by a lens 22 to enter a nonlinear crystal 24 where mixing occurs and the sum frequency generated beam (SFG beam, a pulse corresponding to the pump pulse) is created. The lens 22 focuses the pre-mixed beam 52 into a focused beam 54 that enter crystal 24 at an angle 28 with respect to a central axis 36 and focuses beam 54 at a point P on the axis 36 within the nonlinear crystal 24. A lens 26 collimates the exiting beam 55 into a mixed beam 56. The mixed beam 56 is split at a first portion of a second combiner 14 into a second or split off pump beam 58 (a pulse) that reflects off of the combiner 14 and a remaining signal beam 62 (including the pulse that is the SFG beam) that passes through the combiner 14. The split off pump beam 58 is reflected by the pump retro-reflector 30 as a reflected pump beam 60. The remaining signal beam 62 is reflected by the signal retro-reflector 40 as a reflected composite signal beam 70. The reflected pump beam 60 and the reflected composite signal beam 70 combine at a second portion of the second combiner 14 to form a combined beam 72. The combined beam 72 is focused into beam 74 that passes through the optical mixer 20 and emerges as beam 75 that is collimated into an output beam 76. The output beam 76 is filtered by a filter 16 to pass only the wavelength of the SFG beam that becomes a filtered beam 6. The filtered beam 6 is detected by detector 80.

The optical sampling oscilloscope front end 10 accounts for the polarizations of light beams that are sample. The direction of the electric field of a light beam customarily defines the polarization of the beam, although other definitions of the polarization of the beam may be used as well if used consistently. A light beam with a planar wave front travels in a direction perpendicular to the direction of the electric field of the beam. Thus, the polarization of the beam, as defined by the electric field of the beam, lies in a plane that is perpendicular to the direction of travel, and the polarization may be along any arbitrary direction within the plane. Generally, the polarization vector is spoken of as having two vector components: one component is referred to as a vertical component and the other component is referred to as the horizontal component. The vertical and horizontal components combine to form the polarization vector.

In FIG. 1, the vertical component of the polarization vector of the signal beam under test 2, of a pre-mixed beam 52, of a mixed beam 56, of a remaining signal beam 62, of a reflected signal beam 70, of a combined beam 72 and of an output beam 76 will be regarded as being directed up or down as depicted in FIG. 1, and the horizontal component of the polarization vector of the signal beam under test 2, of the pre-mixed beam 52, of the mixed beam 56, of a remaining signal beam 62, of a reflected signal beam 70, of a combined beam 72 and of an output beam 76 will be regarded as being directed into or out of the paper as depicted in FIG. 1. In FIG. 1, due to the angle of combiners 12 and 14, the vertical component of the polarization vector of the first pump beam 4, of a split off pump beam 58, and of a reflected pump beam 60 will be regarded as being directed to the left or to the right as depicted in FIG. 1, and the horizontal component of the polarization vector of the first pump beam 4, of the split off pump beam 58, and of the reflected pump beam 60 will be regarded as being directed into or out of the paper as depicted in FIG. 1.

In an example of the invention, the pump beam 4 is vertically polarized, and the signal beam under test is arbitrarily polarized and has both a vertically polarized component and a horizontally polarized component. Persons of ordinary skill in the art in light of these teachings will appreciate that the pump beam may also be horizontally polarized instead of vertically polarized, or it may be polarized at any predetermined angle that is consistent with the poling orientation of the periodically poled non-linear crystal.

The combiner 12 (e.g., a dichroic beam splitter) and the optical mixer 20 combine and mix (e.g., in a heterodyne sense) an arbitrarily polarized input signal beam under test 2 and the first pump beam 4 of known polarization (e.g., vertically polarization). In one particular example of the invention, the signal beam under test 2 is an optical signal having a wavelength within a hand about 1,550 nm and having a polarization that may be arbitrary with respect to a polarization of pump beam 4. The signal beam under test 2 may be, but need not be restricted to, a pulsed beam of light of arbitrary polarization where the pulse repetition rate is in the range of 10 to 100 s of gigahertz. The pump beam 4 is typically a pulse train of repeated short sampling pulses (e.g., as from a laser) with a wavelength of, for example 780 nm, or shorter than the signal beam under test. The pump beam 4 is the sampling signal and is typically a pulsing optical beam that repeats pulses, for example, at 50 million pulses per second where each pulse has a duration of about 100 femtoseconds. The pump beam 4, that is preferably provided by a laser in the oscilloscope (or other source but typically a laser such as a mode lock laser) to the combiner 12, is well controlled to provide a pump beam with a defined polarity, a defined signal strength and a defined wavelength.

The combiner 12 is typically a dichroic beam splitter optically coated to reflect the pump beam 4, but pass other wavelengths including the signal beam under test 2; however the combiner 12 can be any device that will combine into one beam (i.e., pre-mixed beam 52) the separate pump beam 4 and the signal beam under test 2.

Figure 2:
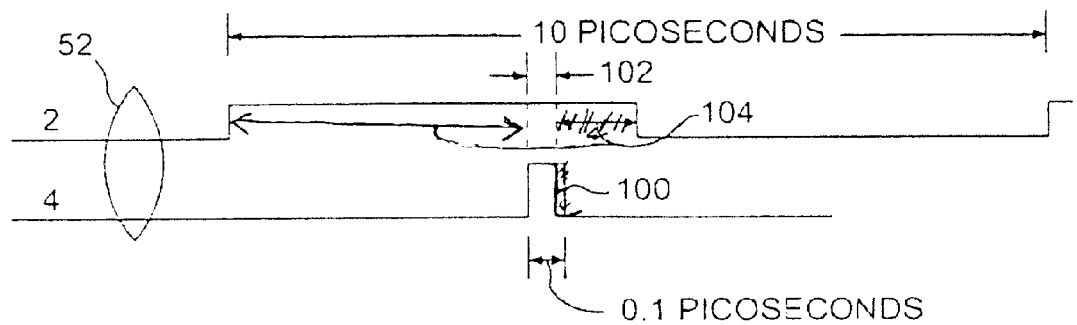
FIGS. 2 and 3 are timing diagrams of signals contained in beams 52 and 70, respectively.

FIG. 2 is a representative timing diagram of the pre-mixed beam 52 out of the first combiner 12 showing the signal beam under test 2 at one wavelength and a pulse repetition frequency of about 100 gigahertz and showing the pump beam 4 at another wavelength with the pulse width of about 100 femtoseconds. A pulse 100 of the pulsed pump signal 4 aligns with an initial time sample 102 of the signal beam under test 2.

The optical mixer 20 is characterized by a central axis 36 and includes a first achromatic lens 22, a nonlinear crystal 24 and a second achromatic lens 26 disposed along the central axis. However, folded optical designs could be designed to be equivalent, just not preferred. Both the signal beam under test 2 and the pump beam 4 are carried in the pre-mixed beam 52 and have planar wave fronts that propagate in a line largely parallel to, but offset laterally from, the central axis 36 of the optical mixer 20. The first achromatic lens 22 converts the planar wave fronts of the pre-mixed beam 52 into spherical wave fronts of a first focused beam 54 that are focused at a point on the central axis 36 and inside of the nonlinear crystal 24 (preferably in the center). The second achromatic lens 26 converts the spherical wave fronts emanating from the point within the nonlinear crystal as the first focused beam 54 plus the products of mixing (discussed herein) into approximately planar wave fronts of a first mixed beam 56. The first mixed beam 56 has planar wave fronts that propagate in a line largely parallel to, but offset laterally from, the central axis 36 of optical mixer 20.

The vertically polarized component of the signal beam under test 2 interacts with the vertically polarized first pump beam 2 within the nonlinear crystal 24 to produce, on a first pass, a vertically polarized sum frequency generation pulse (SFC pulse) having a wavelength of about 519 nm (for the wavelengths of the pump and signals discussed in this example. The SFG pulse has a sum frequency (that is inversely proportional to an SFG wavelength) equal to a sum of a signal frequency (that is inversely proportional to signal wavelength) of the signal beam under test 2 and a pump frequency (that is inversely proportional to pump wavelength). The horizontally polarized component of the signal beam under test 2 does not interact with the vertically polarized first pump beam 2 within the nonlinear crystal 24 on the first pass since the nonlinear crystal 24 has been chosen to mix only vertical components (in this example). The SFG pulse generated in nonlinear crystal 24 on a first pass is vertically polarized.

It will be appreciated by persons ordinarily skilled in this art in light of these teachings that the particular wavelengths discussed in this example, and the relative wavelengths discussed in this example (e.g., that the pump wavelength is between the wavelengths of the signal under test and the SFG pulse), are illustrative and not limiting. For example, the signal wavelength might be 1,550 nm, the pump wavelength might be 519 nm, and the difference frequency generated pulse wavelength about 780 nm (actually a frequency difference in this example). In fact, any heterodyne relation may be used.

The first mixed beam 56 carries the horizontal component of the signal beam under test 2, some remaining part of the vertical component of the signal beam under test 2 that will be discarded later, (he vertically polarized pump beam 2 still at a significant power level (to interact on a second pass), and a vertically polarized SFG pulse. Due to dispersion in the nonlinear crystal 24 (or other components), the signal beam under test propagates faster than the pump beam, and the pump beam in turn propagates faster than the SFG pulse.

The nonlinear crystal 24 is preferably a periodically poled lithium niobate (PPLN) crystal. A lithium niobate crystal has inherent polarization characteristics where one end of the crystal is characterized by a positive pole and the other end is characterized by a negative pole, thus defining a polarity direction between. A PPLN crystal has many layers where the polarity directions reverse periodically between layers. For example, as depicted in FIG. 1, the nonlinear crystal 24 includes plural layers with interlayer planes generally defined to be normal to the central axis 36 of optical mixer 20 and separated by a small extent in an axial direction along the central axis 36. Periodically poled means that half of the layers are polarized with a vector from a positive pole to a negative pole oriented from top to bottom (as depicted in FIG. 1) while a second half of the layers, interleaved with respect to the first half, are polarized with a vector from a positive pole to a negative pole oriented from bottom to top (as depicted in FIG. 1).

The rate that polarization layers in a periodically poled nonlinear crystal reverse is tuned to the SFG wavelength. Since mixing effects in any single layer arc weak, tuning the poling rate to the SFG wavelength permits the weak mixing in the several layers to accumulate coherently. Simultaneously, any difference frequency generated by mixing is subject to destructive cancellation since the poling rate is random with respect to the difference frequency generated wavelength. These difference frequency generated mixing products add non-coherently and become part of the mixer noise.

To exploit larger nonlinearity, one prefers a periodically-poled crystal with the poling Bragg vector defining the axis of "on-axis" operation. Momentum (k-vector) conservation in the off-axis geometry implies that at most two of the three wave vectors can be collinear. Non-collinearity in air is inconsequential as it only implies a slight spatial offset of the beam centers at the dichroic elements; since the dichroics are large, one simply translates the beams appropriately. However, excessive noncollinearity in the nonlinear crystal results ill reduced efficiency for focused beams. The least noncollinear situation occurs if the signal and pump are collinear and the SFG beam veers slightly. From k-vector conservation, Snell's law, small-angle approximation, and weak refractive index dispersion of the crystal, one obtains:

$$\Theta_v = \frac{\lambda_{SFG}}{n\Lambda}\Theta_0$$

where $\Theta_v$ is the veering angle from collinearity inside the crystal, $\Theta_0$ is the angle away from the normal outside of the crystal (the off-axis angle), $\lambda_{SFG}$ is the SFG wavelength, $\Lambda$ is the poling (Bragg) period, and n is the pertinent crystal refractive index. Taking PPLN as an example with n=2.2, $\lambda_{SFG}$=0.52 um, $\Lambda$=7 um, and $\Theta_0$=5.3 degrees (so the angular separation between the first and second beam passes through the crystal is 10.6 degrees), we have $\Theta_v$=0.177 degrees. On the other hand, the SFG Gaussian beam half-angle is w0/z0 where w0 is the minimum spot size (radius) and z0 is the Rayleigh range. For a typical z0=0.5 mm, this half-angle is 0.7 degrees. Thus, the veering angle is well within the beam divergence and the calculated reduction in efficiency relative to strict collinearity with the Bragg vector is only ~6%. The signal beam half-angle outside the crystal is 2.63 degrees, sufficiently less than the 5.3-degree off-axis angle of incidence. Isolation between forward and reverse beams is estimated at 70 dB.

In a practical example, at the wavelengths discussed generally throughout, the nonlinear crystal 24 is about 1 to 10 millimeters long (at least for the wavelengths discussed), and periodic poling within the crystal is based on polarity reversals ranging from 5 to 10 micrometers, but this periodicity may change as it depends on known relations between the wavelength of the light being processed and the index of refraction of the media. The height of the crystal (up and down as depicted in FIG. 1) and depth of the crystal (into and out of the paper as depicted in FIG. 1) preferably varies between perhaps one-half and 3 millimeters. These dimensions depend on the ability to focus beams onto input and output surfaces of the nonlinear crystal 24.

Although the above discussion uses PPLN as the nonlinear crystal 24, other nonlinear optical crystals may be used for diverse applications, and the choice depends largely on properties of the signals to be mixed and material properties of the crystals. For example, see Table 1 below for other nonlinear materials.

TABLE 1

| Chemical Name | Common Name |
| --- | --- |
| $Ag_3AsS_3$ | proustite |
| Te | tellurium |
| $Tl_3AsSe_3$ | TAS |
| $CdGeAs_2$ | |
| $AgGaS_2$ | |
| $AgGaSe_2$ | |
| GaAs | |
| $LiNbO_3$ | lithium niobate |
| $LiIO_3$ | lithium iodate |
| $NH_4H_2(PO_4)_2$ | ammonium dihydrogen phosphate, ADP |
| $KH_2(PO_4)_2$ | potassium dihydrogen phosphate, KDP |
| $KD_2(PO_4)_2$ | potassium dideuterium phosphate, KD*P |
| $RbH_2(AsO_4)_2$ | rubidium dihydrogen arsenate, RDA |
| $RbH_2(PO_4)_2$ | rubidium dihydrogen phosphate, RDP |
| $NH_4H_2(AsO_4)_2$ | ammonium dihydrogen arsenate, ADA |
| $KD_2(AsO_4)_2$ | potassium dideuterium arsenate, KD*A |
| $CsH_2(AsO_4)_2$ | cesium dihydrogen arsenate, CDA |
| $CsD_2(AsO_4)_2$ | cesium dideuterium arsenate, CD*A |
| $KTiOPO_4$ | potassium titanyl phosphate, KTP |
| $LiCHO_2.H_2O$ | lithium formate monohydrate, LFM |
| $KB_5O_8.4H_2O$ | potassium pentaborate, KB5 |
| Urea | |

The first mixed beam 56 includes several components, each having a planar wave front, including: a horizontal component of the signal beam under test 2, a vertical component of the signal beam under test 2 (but at a reduced signal power), the vertically polarized pump beam 4 at a slightly reduced signal power, and the sum frequency generation pulse (i.e., the SFG pulse at a shorter wavelength). The first mixed beam 56 propagates onto a first portion of the second combiner 14 (that serves as a beam splitter) to split off the pump beam as a split off pump beam 58 (still vertically polarized) and pass the remaining signals (i.e., the horizontal component of the signal beam under test 2, a vertical component of the signal beam under test 2, but at a reduced signal power, and the sum frequency generation pulse, the SFG pulse) as a remaining signal beam 62. The pump retro-reflector 30 returns the split off pump beam 58, as reflected pump beam 60 traveling in a direction opposite to pump beam 58 but still vertically polarized and at a lateral displacement from beam 58, to a second portion of the second combiner 14 as discussed more fully herein. The signal retro-reflector 40 returns the remaining signal beam 62, as the reflected composite signal beam 70 traveling in a direction opposite to the remaining signal beam 62 and at a lateral displacement to the beam 62 to the second portion of the second combiner 14 as discussed more fully herein. In addition, a polarization of the signal beam under test component of the reflected composite signal beam 70 is rotated 90 degrees with respect to signal beam under test component of the remaining signal beam 62 (i.e., horizontal polarization become vertically polarized and vice versa) due to the quarter wave plate 42. It will be appreciated by persons of ordinary skill in the art in light of these teachings that the first portion of the second combiner 14 and the second portion of the second combiner 14 might be separate dichroic beam splitters that are oriented as if they were one.

The pump retro-reflector 30 includes a prism 32 that retro-reflects the split off pump beam 58 after two "bounces" as reflected pump beam 60. To correct for slight aberrations that may exist due to the non-optimal design of lenses at the pump beam wavelength, pump retro-reflector 30 optionally also includes correcting lens 34. The signal retro-reflector 40 includes a quarter wave plate 42 and a prism 44 that retro-reflects the remaining signal beam 62 in two "bounces" as reflected composite signal beam 70. The prism 44 includes an initial reflection surface 46 and a final reflection surface 48.

In general, light propagating through the quarter wave plate 42 is slowed by an amount that depends on the polarization of the light. A light beam polarized in a first direction oriented parallel to a principal axis of the quarter wave plate will be slowed with respect to a light beam polarized in a second direction oriented perpendicular to the principal axis of the quarter wave plate. Here, the principal axis is being defined as the axis that will most slow the light beam. The name quarter wave plate derives from a thickness of the plate where the amount of slowing of light oriented parallel to the principal axis is one quarter of a cycle more than the amount of slowing of light oriented perpendicular to the principal axis.

In a typical application of a quarter wave plate that converts a linearly polarized light beam into a circularly polarized light beam, the principal axis of the quarter wave plate is oriented 45 degrees with respect to the polarization axis of the light beam being rotated. In the present case, the horizontal component of the signal beam under test is to be processed because it had not been mixed with the pump beam in the first pass through the nonlinear crystal 24, and thus, the principal axis of the quarter wave plate is oriented plus or minus 45 degrees from the horizontal. The polarization of the light beam being rotated (e.g., horizontal) is regarded as parsed into first and second components oriented parallel to the principal axis and perpendicular to the principal axis, respectively (e.g., plus or minus 45 degrees from the horizontal). The first component, being oriented parallel to the principal axis, is slowed by a quarter of a cycle as compared to the second component, being oriented perpendicular to the principal axis. This imparts a circular polarization to the light beam originally linearly polarized. Whether the circular polarization is right hand (RH) circular or left hand (LH) circular depends on whether the 45 degree orientation of the principal axis of the quarter wave plate is oriented clockwise or counterclockwise with respect to the linear polarization axis of the input light beam, and of course, one's definition of RH and LH circular.

In the signal retro-reflector of FIG. 1, assume that the quarter wave plate 42 is oriented to convert a horizontally polarized signal within remaining signal beam 62 into a first RH circular polarized beam 64. Then, the first RH circular polarized beam 64 is converted into a LH circular polarized beam 66 as it bounces off of the initial reflection surface 46. Then, the LH circular polarized beam 66 is converted into a second RH circular polarized beam 68 as it bounces off of the final reflection surface 48. The second RH circular polarized beam 68 is then converted into a vertically polarized signal within the reflected composite signal beam 70 as it passes through the quarter wave plate 42. As described here, a horizontally polarized signal is converted to RH circular, to LH circular, to RH circular then to a vertically polarized signal. It will be apparent to persons skilled in the art in light of these teachings that a horizontally polarized signal could alternatively be converted to LH circular, to RH circular, to LH circular then to a vertically polarized signal (i.e., oppositely circularly polarized).

In the present example, the remaining signal beam 62 includes the originally horizontal component of the signal beam under test 2, the originally vertical component of the signal beam under test 2 (but at a reduced signal power) and the originally vertically polarized sum frequency generation pulse (i.e., the SFG pulse). However, due to the polarization rotation effects of the quarter wave plate 42 in the signal retro-reflector 40, the reflected composite signal beam 70 includes the originally horizontal component of the signal beam under test 2 (now rotated to be vertically polarized), the originally vertical component of the signal beam under test 2 (now rotated to be horizontally polarized) and the originally vertically polarized SFG pulse (now rotated to be arbitrarily polarized since the SFG wavelength reacts differently with the quarter wave plate 42 than does the signal beam under test wavelength).

The reflected composite signal beam 70 is combined with the reflected pump beam 60 (vertically polarized) at the second portion of the second combiner 14 to produce the combined beam 72. Due to dispersion effects through the optical components from the generation of the SFG pulse in the first pass through the nonlinear crystal 24 through to a second pass through the nonlinear crystal 24, the original horizontal component of the signal beam under test 2 (having a wavelength of 1,550 mn in this example and now rotated to be vertically polarized in the combined beam 72) propagates faster than the pump beam (having a wavelength of 780 nm in this example and remaining vertically polarized in the combined beam 72) which in turn propagates faster than the originally vertically polarized SFG pulse (having a wavelength of about 519 nm in this example and now rotated to be arbitrarily polarized in the combined beam 72) produced in the first pass through the nonlinear crystal 24.

As illustrated in FIG. 2, a representative timing diagram of the pre-mixed beam 52 out of the first combiner 12, the pump beam 4 is by happenstance delayed with respect to a leading edge of a pulse of the signal beam under test 2 by an arbitrary time delay 104 that is a function of synchronization between the sampling rate (e.g., 50 MHz in one embodiment) and the pulses of the about 100 gigahertz pulsed signal beam under test 2. On a first pass through the nonlinear crystal 24, the pump beam 4 produces an SFG pulse by interaction with the vertical component of the signal beam under test 2 (vertical in this example) within the nonlinear crystal 4. This SFG pulse is polarized in the same orientation (e.g., vertical) as the pump beam 4 and has a signal magnitude proportional to the signal magnitudes of both the pump beam 4 and the component of the signal beam under test 2 that is aligned with the polarization of the pump beam 4 (e.g., vertical).

Then, since these signals in the beams have different wavelengths, this SFG pulse is further delayed relative to both the vertical and horizontal components of the signal beam under test 2 as both the SFG pulse and the signal beam under test pass through the optical components between the nonlinear crystal 24 and the second portion of the second combiner 14 to become part of the combined beam 72. At the second portion of the second combiner 14, the reflected pump beam 60 superimposes over the reflected composite signal beam 70 to become the combined beam 72.

Figure 3:
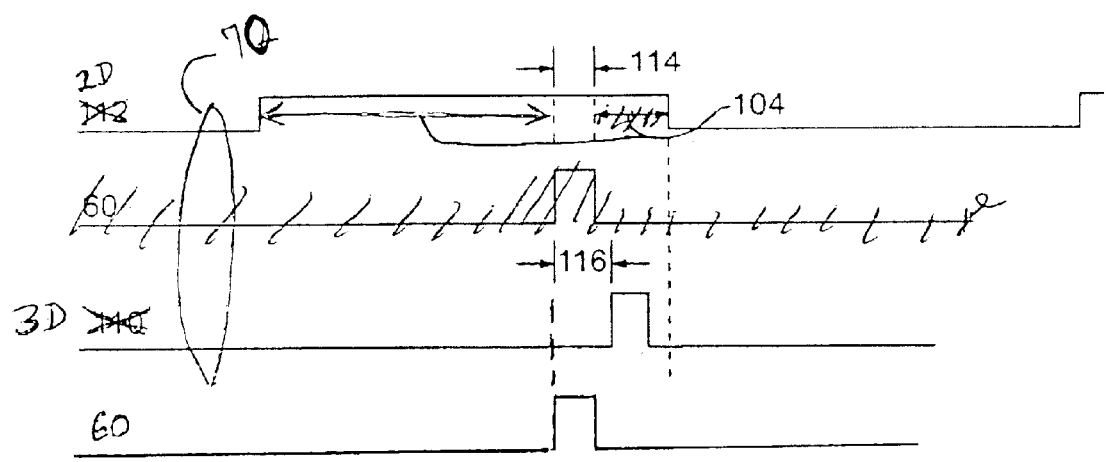

In FIG. 3, the combined beam 72 includes at least the delayed SFG pulse 3D produced in the first pass through the nonlinear crystal 24, the delayed signal beam under test 2D, and the reflected pump beam 60. In this example, the reflected pump beam 60 is of the same polarization as the pump beam 4 (e.g., vertically polarized). The time alignment of the pulse of the reflected pump beam 60 relative to a leading edge of a pulse of the signal beam under test after being rotated in the signal twist reflector 40 and as it passes through the second combiner 14 is adjustable by moving the pump retro-reflector 30 closer to or farther from the second combiner 14 or by moving the signal twist reflector 40 closer to or farther from the second combiner 14. In operation, the pump retro-reflector 30 is moved closer to or farther from the second combiner 14 or the signal twist reflector 40 is moved closer to or farther from the second combiner 14 so that the reflected pump beam 60 is delayed by the arbitrary time delay 104 relative to the leading edge of a pulse of the signal beam under test after being rotated in the signal twist reflector 40 and as it passes through the second combiner 14 (i.e., delayed signal beam under test 2D). The reflectors 30, 40 are disposed in relative arrangement with respect to the combiner 14 so that a subsequent time sample 114 of the component of the delayed signal beam under test 2D aligns with the pulse of the reflected pump beam 60.

The SFG pulse that was generated in the first pass through the nonlinear crystal 24 is of the same polarization as the pump beam 4 (e.g., vertically polarized), but the polarization of this SFG pulse has become arbitrarily oriented by the signal retro-reflector 40 by the time it becomes a rotated delayed SFG pulse 3D that is part of the combined beam 72.

The delayed SFG pulse 3D is delayed with respect to the leading edge of a pulse of the signal beam under test due to dispersion by a greater delay 116 than the arbitrary delay 104 depicted in FIG. 2. The first pass delayed SFG pulse 3D (arbitrarily polarized) will not further interact with the reflected pump beam 60 (vertically polarized) in nonlinear crystal 24 due to the vanishing temporal overlap.

In general, the polarization of the pump signal 4 may be oriented in any predetermined direction that is consistent with the poling orientation of the periodically poled nonlinear crystal. The component (e.g., the vertical component in the above example) of the signal beam under test 2 that is polarized in alignment with the poling orientation, as is the pump beam, then interacts with the pump beam on the first pass through the nonlinear crystal 24. The component of the signal under test that interacts with the pump beam on the first pass becomes rotated by the signal retro-receptor 40 to be orthogonal to the poling orientation of the periodically poled nonlinear crystal, and the rotated component of the signal under test is thus orthogonal to the polarization of the reflected pump beam 60 by the time it becomes part of the combined beam 72. The rotated component of the signal beam under test 2 that has a polarization in alignment with the pump beam and interacts with the pump beam on the first pass will not further interact with the reflected pump beam 60 in the periodically poled nonlinear crystal 24 on the second pass due to the orthogonal polarizations.

However, the component (e.g., horizontal component in the above example) of the signal beam under test 2 that was orthogonal to and did not interact with the pump beam 4 on the first pass through the nonlinear crystal 24 becomes rotated 90 degrees by the signal retro-reflector 40 to be of a polarization aligned with both the poling orientation of the periodically poled nonlinear crystal and the reflected pump beam 60 by the time it becomes part of the combined beam 72. Therefore, it will further interact with the like polarized reflected pump beam 60 in nonlinear crystal 24 to produce a like polarized second pass SFG pulse. The first and second pass SFG pulses are all that is needed to completely sample both orthogonal polarizations of the original signal beam under test 2. The output beam 76 includes both the first and second pass SFG pulses plus other lights that are of a different wavelength. The output beam 76 passes through a filter 16 (e.g., a coated optical filter) with a pass band constructed to pass only wavelengths of the SFG pulses and produce a filtered beam 6. The filtered beam 6 is detected in detector 80. Detector 80 may be of any detector technology that turns optical signals into electrical signals, for example, photodiodes, pinned photodiodes, phototransistors, avalanche photodiodes, P-I-N photodiodes and photo-multiplier tubes, etc.

Even if the first pass SFG pulse is not rotated 90 degrees, there is no interference between the two pulses because by moving the reflectors 30, 40 relative to each other and the combiner 14, the pump pulse can be advanced relative to the signal pulse so that the first pass SFG pulse is retarded relative to the reflected pump pulse 60. Thus, the second pass SFG light is actually propagated to the detector 80 and collected before the first pass SFG light propagates to the detector 80.

This feature enables construction of another example of the invention where the first part of the beam splitter 14 (also called combiner 14) passes only the signal beam (e.g., a beam having a wavelength in a narrow band about 1,550 nm) on to the signal twist reflector 40 and reflects both the pump beam and the first pass SFG pulse into the pump retro-reflector 30. The first pass SFG pulse will be delayed with respect to the split off pump pulse due lo dispersion; therefore, the SFG pulse will not further mix in a second pass through the nonlinear crystal 24.

In the above described example of the apparatus, the pump beam is a pulsed beam and the quarter wave plate 42 preferably has a thickness $d_{SIG}$ that produces a differential retardation of the principal polarizations of the signal light passing through the quarter wave plate equal to 90 degrees or one quarter of the signal wavelength. In this way, the signal beam polarization is rotated 90 degrees by signal retro-reflector 40, but the SFG beam polarization is rotated by an arbitrary angle since the wavelength of the SFG; beam has an arbitrary relation to the wavelength of the signal beam under test and the quarter wave plate material is generally dispersive. However, the apparatus will work equally well if the quarter wave plate 42 had a thickness that is an odd multiple of $d_{SIG}$. The first pass SFG pulse will not further interact wvith the reflected pump pulse on the second pass due to temporal separation.

In an alternative example of the above described apparatus, the pump beam is a continuous wave beam, and the quarter wave plate 42 has a thickness that meets two criteria. First, the quarter wave plate 42 has a thickness that produces a differential retardation of one of the principal polarizations relative to the other polarization of the signal light passing through the quarter wave plate equal to an odd multiple of 90 degrees or one quarter of the signal wavelength (e.g., a thickness $n*d_{SIG}$, where n is odd). Second, the quarter wave plate 42 has a thickness that also produces a differential retardation of the principal polarizations of the SFG light passing through the quarter wave plate equal to an odd multiple of 90 degrees or one quarter of the SFG wavelength (e.g., a thickness $m*d_{SFG}$, where m is odd). The integers m and n need not be, and seldom are, equal. In this way, the signal retro-reflector 40 rotates both the signal beam under test and the continuous wave second pass SFG beam by 90 degrees, and both vertical components (in this example) of the signal beam under test and the SFG beam will not further interact (i.e., mix) with the reflected pump beam.

The second pass through the nonlinear crystal 24, however, will produce a second pass continuous wave SFG beam from the originally horizontal component (in this example) of the signal beam under test that was rotated by the signal retro-reflector 40 to a vertical polarization (in this example). On the second pass, the newly vertical component (in this example) of the signal beam under test will interact (i.e., mix) with the reflected pump beam to produce the continuous wave second pass SFG beam. The first pass continuous wave SFG beam and the second pass continuous wave SFG beam as they pass through filter 16 are mutually orthogonal, and the first pass SFG beam is delayed relative to the second pass SFG beam by a predetermined time delay. Then, should time alignment between the polarizations prove important, the detector 80 is replaced by a polarization beam splitter so that the faster SFG beam polarization can be delayed relative to the slower SFG beam polarization by a differential delay line (e.g., differential length optical paths) before the beams become recombined in a time aligned arbitrary polarization SFG beam that is the heterodyned replica of the original signal beam under test 2. Such an apparatus could advantageously serve in down or up converters in, for example, fiber optic communication links.

Persons of ordinary skill in the art in light of these teachings will appreciate that other constructions can be made such as where the pump beam and first pass SFG beam are passed through, not reflected from, the first part of the beam splitter 14 (i.e., the combiner 14), where the polarization of these beams are then rotated in twist reflector 40, and where the signal beam is reflected from the first part of the beam splitter 14 into the retro-reflector 30 where the signal beam is reflected without polarization rotation. Persons so skilled will appreciate that the second pass mixing then takes place at a polarization that is orthogonal to the first pass mixing. In such construction, an angle-tuned type II nonlinear crystal (e.g., a crystal made of KTP) is preferred over a periodically poled nonlinear crystal.

Eventually, all light beams exit the first face of the crystal 24 and pass through the first lens 22 at a location on the lens that is spatially offset from the incoming beam 52 so as to provide isolation. Finally, a filter 16 rejects the signal and pump wavelengths and passes on the SFG light to be detected by detector 80.

Additionally, the apparatus advantageously includes a means for equalizing the first and second pass channels. Although nonlinear absorption of the pump pulse is negligible for the small signals used in optical communications, expected linear absorption of both signal and pump through the various optics will weaken the second pass signals relative to the first pass signal. This can be equalized in the delay path. The dichroic beam splitter, the wave plate, and/or the prism can be chosen out of material that is highly transparent at the signal wavelength but not as transparent at the SFG wavelength. This partially attenuates the first pass channel. A simple way to accomplish this is to coat one or both of the signal/SFG prism legs 46, 48 (but not the hypotenuse) with gold, which is highly reflective in the 1530–1620 nm band but less so in the visible. The pump prism is left uncoated, relying simply on total internal reflection.

One sees that the present scheme avoids any 3 dB penalty and yet also avoids a need for a second nonlinear crystal or any expensive Faraday rotators. The present invention does away with a need for a lens that simultaneously focuses achromatically and compensates the pump signal time lag. Temporal compensation is easily achieved due to separate signal and pump delay paths. Off-axis operation in the crystal implies offset collimated beams outside the lenses, naturally leading to use of a two-bounce prism rather than one-bounce mirrors. The use of an even number of bounces in the signal twist reflector 40 rather than the odd number of bounces as would be provided in a flat mirror permits the use of the cheaper quarter wave plate rather than the 45 degree Faraday rotator to achieve a 90 degree polarization rotation.

It is to be understood by persons of ordinary skill in this art in light of these teachings that the components of the examples of the invention discussed above have counterparts in the microwave frequency bands (e.g., lasers become masers, etc.) and lower frequencies. It is therefore to be understood that examples of the invention include apparatuses that operate at microwave frequencies.

Figure 4:
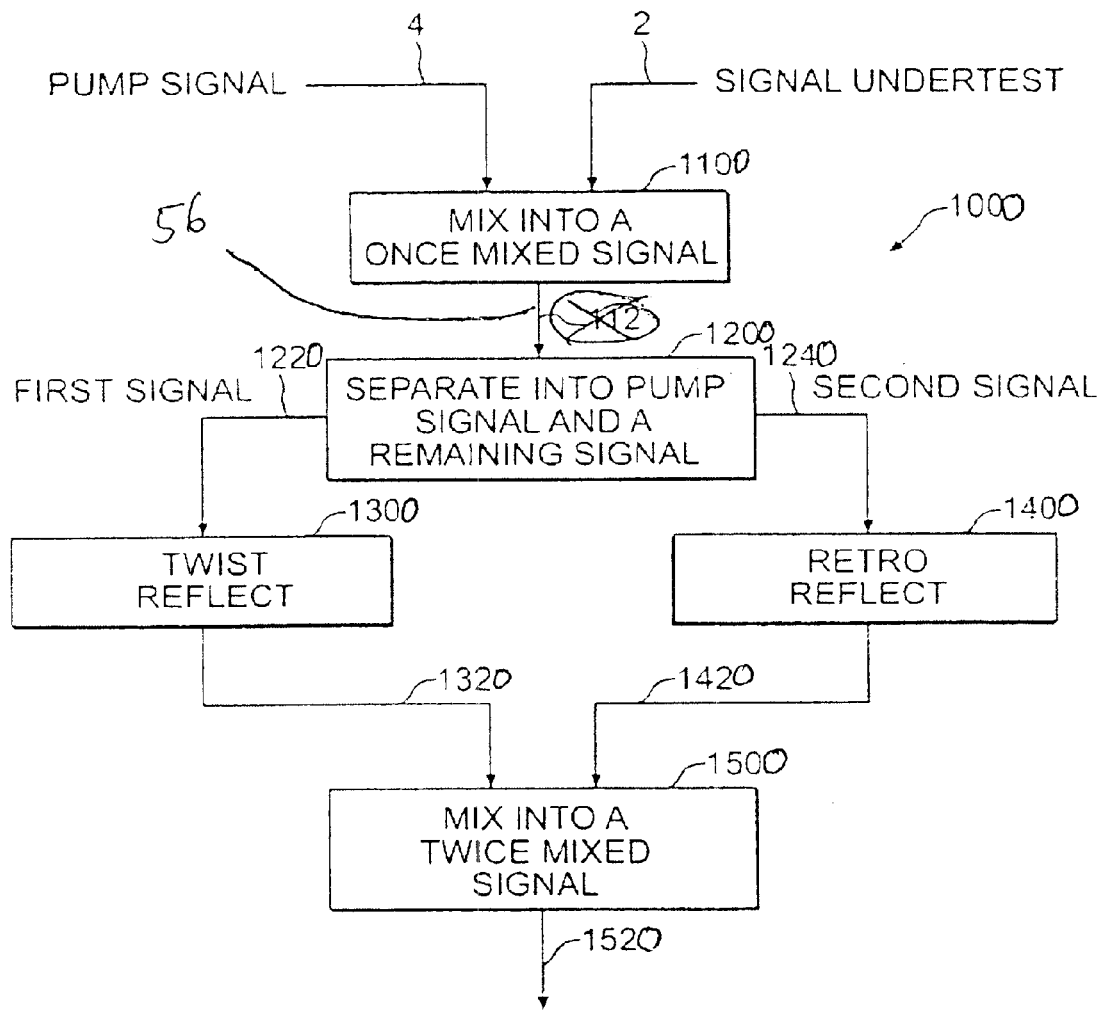
FIG. 4 is a flow chart of a method according to the invention.
Figure 5:
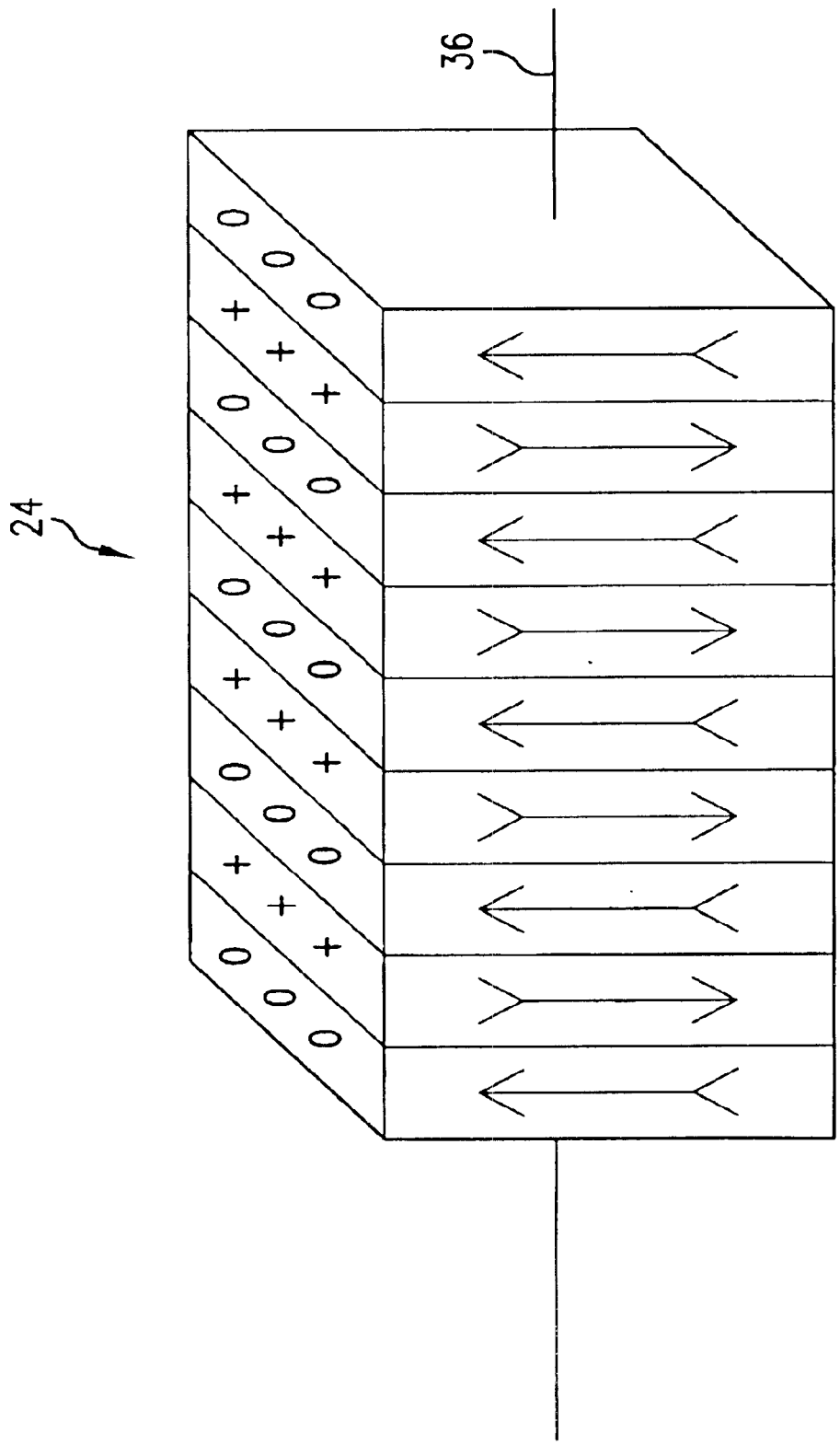
FIG. 5 is a schematic diagram of a periodically-poled nonlinear crystal.

In other examples of a method 1000 of the invention, methods of mixing a pump signal 4 with a signal under test 2 are depicted in FIG. 4. In step 1100, the pump signal 4 of a predetermined polarity is mixed with the signal under test 2 of an arbitrary polarity to produce a once mixed signal 56. In step 1200, the once mixed signal is separated into a separated pump signal and a remaining signal. One of the separated pump signal and the remaining signal is defined as a first signal 1220, and the other of the separated pump signal and the remaining signal is defined as a second signal 1240. The first signal is twist reflected in step 1300 to provide a twist reflected first signal 1320, and the second signal is retro-reflected in step 1400 to provide a retro-reflected second signal 1420. In step 1500, the twist reflected first signal 1320 and the retro-reflected second signal 1420 are mixed into a twice mixed signal 1520.

In a particularized variant of the method 1000, the separating step 1200 includes radiating the once mixed signal 56 onto a dichroic beam splitter, reflecting the first signal 1220 from the dichroic beam splitter, and passing the second signal 1240 through the dichroic beam splitter.

In another particularized variant of the method 1000, the twist reflecting step 1300 includes rotating a polarization of the first signal 1220 by 90 degrees, and the retro-reflecting step 1400 includes reflecting without polarization rotation the second signal 1240.

In yet another particularized variant of the method 1000, the mixing step 1100 that provides a once mixed signal 56 includes propagating the pump signal 4 and the signal under test 2 along a first line through a nonlinear crystal 24, and the mixing step 1500 that provides a twice mixed signal 1520 includes propagating both the twist reflected first signal 1320 and the retro-reflected second signal 1420 along a second line through the nonlinear crystal 24. The first and second lines are non-parallel. In particular, in a refinement, the twist reflecting step 1300 includes rotating a polarization of the first signal 1220 by 90 degrees, and the retro-reflecting step 1400 includes reflecting without polarization rotation the second signal 1240.

Having described preferred embodiments of a novel optical sampling oscilloscope front end and method of sampling (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters patent is set forth in the appended claims.

What is claimed is:

1. An apparatus comprising:
    a mixer having first and second inputs and having first and second outputs;
    a combiner that includes first and second parts, the first output providing a mixed signal to the first part, the second part providing a combined signal to the second input;
    a first reflector to receive a remaining signal from the first part and provide a reflected composite signal to the second part; and
    a second reflector to receive a split off pump signal from the first part and provide a reflected pump signal to the second part.

2. The apparatus of claim 1, wherein the first reflector includes an optical quarter wave plate.

3. The apparatus of claim 2, wherein the first reflector further includes a prism with an even number of bounces.

4. The apparatus of claim 1, wherein the second reflector includes a lens.

5. The apparatus of claim 1, wherein:
    the second reflector includes an optical quarter wave plate; and
    the mixer includes an angle-tuned type II nonlinear crystal.

6. The apparatus of claim 1, wherein the mixer is characterized by a central axis and includes a nonlinear crystal disposed along the central axis.

7. The apparatus of claim 6, wherein the first reflector includes an optical quarter wave plate.

8. The apparatus of claim 7, wherein the first reflector further includes a two-bounce prism.

9. The apparatus of claim 6, wherein:
    the mixer further includes first and second lenses disposed along the central axis;
    the mixed signal is a beam that is parallel to and offset from the central axis and radiates on the first part;
    the combined signal is a beam that is parallel to and offset from the central axis and originates at the second part;
    the second lens is disposed so as to both (a) collimate a light originating at a point on the central axis that is inside the nonlinear crystal into the mixed signal, and (b) focus the combined signal onto the point on the central axis; and
    the mixed signal is parallel to and offset from the combined signal.

10. The apparatus of claim 9, wherein:
    the first part includes a dichroic coating to reflect a first portion of the mixed signal as the split off pump signal and pass a second portion of the mixed signal as the remaining signal; and
    the first part is oriented with respect to the central axis to reflect the split off pump signal into the second reflector and to pass the remaining signal into the first reflector.

11. The apparatus of claim 10, wherein:

the second part includes a dichroic coating to reflect the reflected pump signal as a first portion of the combined signal and pass the reflected composite signal as a second portion of the combined signal; and the second part is oriented with respect to the central axis to superimpose the first and second portions of the combined signal to form the combined signal.

12. The apparatus of claim 9, wherein:

the first part includes a dichroic coating to pass a first portion of the mixed signal as the split off pump signal and reflect a second portion of the mixed signal as the remaining signal; and the first part is oriented with respect to the central axis to pass the split off pump signal into the second reflector and to reflect the remaining signal into the first reflector.

13. The apparatus of claim 12, wherein:

the second pan includes a dichroic coating to pass the reflected pump signal as a first portion of the combined signal and reflect the reflected composite signal as a second portion of the combined signal; and the second part is oriented with respect to the central axis to superimpose the first and second portions of the combined signal to form the combined signal.

14. The apparatus of claim 1, wherein:

the first input receives a composite of a signal under test and a pulsed pump signal;

a first pulse of the pulsed pump signal aligns with an initial time sample of the signal under test;

the reflected composite signal includes a component of the signal under test;

the initial time sample in the signal under test corresponds to a subsequent time sample in the component of the signal under test;

the reflected pump signal includes a second pulse that corresponds to the first pulse; and the first and second reflectors are disposed in relative arrangement with respect to the combiner so that the subsequent time sample of the component of the signal under test aligns with the second pulse of the reflected pump signal.

15. The apparatus of claim 14, wherein:

the reflected composite signal further includes a sum frequency generated signal pulse; and the sum frequency generated signal pulse is delayed by a predetermined delay behind the subsequent time sample.

16. A method comprising:

mixing into a once mixed signal a pump signal of a predetermined polarity with a signal under test of an arbitrary polarity;

separating the once mixed signal into a separated pump signal and a remaining signal, one of the separated pump signal and the remaining signal being defined as a first signal, another of the separated pump signal and the remaining signal being defined as a second signal;

twist reflecting the first signal;

retro-reflecting the second signal; and mixing into a twice mixed signal the twist reflected first signal and the retro-reflected second signal.

17. The method of claim 16, wherein the separating includes:

radiating the once mixed signal onto a dichroic beam splitter;

reflecting the first signal from the dichroic beam splitter; and passing the second signal through the dichroic beam splitter.

18. The method of claim 16, wherein:

the twist reflecting includes rotating a polarization of the first signal by 90 degrees; and the retro-reflecting includes reflecting without polarization rotation the second signal.

19. The method of claim 16, wherein:

the mixing into a once mixed signal includes propagating the pump signal and the signal under test along a first line through a nonlinear crystal; and the mixing into a twice mixed signal includes propagating both the twist reflected first signal and the retro-reflected second signal along a second line through the nonlinear crystal, the first and second lines being non-parallel.

20. The method of claim 19, wherein:

the twist reflecting includes rotating a polarization of the first signal by 90 degrees; and the retro-reflecting includes reflecting without polarization rotation the second signal.

* * * * *